US012424047B2

(12) United States Patent
Shin et al.

(10) Patent No.: US 12,424,047 B2
(45) Date of Patent: Sep. 23, 2025

(54) AUTOMATED TELLER MACHINE AND METHOD OF CONTROLLING THE SAME

(71) Applicant: HYOSUNG TNS INC., Seoul (KR)

(72) Inventors: Dahye Shin, Seoul (KR); Jin Yu Lim, Seoul (KR); Hyun Soo Jang, Seoul (KR); Seungki Kim, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 224 days.

(21) Appl. No.: 17/961,049

(22) Filed: Oct. 6, 2022

(65) Prior Publication Data

US 2023/0298423 A1 Sep. 21, 2023

(30) Foreign Application Priority Data

Mar. 16, 2022 (KR) ........................ 10-2022-0032671

(51) Int. Cl.
*G07D 11/245* (2019.01)
*G07D 11/12* (2019.01)
(Continued)

(52) U.S. Cl.
CPC ........... *G07D 11/245* (2019.01); *G07D 11/12* (2019.01); *G07D 11/14* (2019.01); *G07D 11/18* (2019.01);
(Continued)

(58) Field of Classification Search
CPC ...... G07D 11/18; G07D 11/14; G07D 11/245; G07D 2207/00; G07D 2211/00; G07D 11/25; G07D 11/12
See application file for complete search history.

(56) References Cited

U.S. PATENT DOCUMENTS

| | | | | |
|---|---|---|---|---|
| 5,256,862 | A | 10/1993 | Watanabe et al. | |
| 2018/0286164 | A1 | 10/2018 | Lee | |
| 2019/0172292 | A1* | 6/2019 | Fukuda .................. | G07D 11/18 |

FOREIGN PATENT DOCUMENTS

| | | | |
|---|---|---|---|
| EP | 3 480 795 | A1 | 5/2019 |
| KR | 10-1226298 | B1 | 1/2013 |

(Continued)

OTHER PUBLICATIONS

Office Action in Korean Application No. 10-2022-0032671 dated Nov. 12, 2023 and English translation thereof.

(Continued)

*Primary Examiner* — Jeremy R Severson
(74) *Attorney, Agent, or Firm* — BACON & THOMAS, PLLC

(57) ABSTRACT

An automated teller machine includes: a main body; a reception unit; an identification unit; a recycle cassette; a reject cassette; a deposit cassette; a utility cassette; a conveyance path through which a medium is conveyed; and a control unit. The control unit controls the conveyance path such that when the medium is recovered through the recovery transit cassette, the medium recognized as the normal banknote by the identification unit, among mediums stored in the deposit cassette and the recycle cassette, is recovered to the recovery transit cassette, and when the medium is replenished through the replenishment transit cassette, the medium recognized as the rejection banknote by the identification unit, among replenishment mediums stored in the replenishment transit cassette, is replenished to the utility cassette.

10 Claims, 6 Drawing Sheets

(51) Int. Cl.
*G07D 11/14* (2019.01)
*G07D 11/18* (2019.01)
*G07D 11/25* (2019.01)
*G07F 19/00* (2006.01)

(52) U.S. Cl.
CPC ........... *G07D 11/25* (2019.01); *G07F 19/201* (2013.01); *G07D 2207/00* (2013.01); *G07D 2211/00* (2013.01)

(56) References Cited

FOREIGN PATENT DOCUMENTS

| | | | |
|---|---|---|---|
| KR | 10-2016-0139764 | A | 12/2016 |
| KR | 10-2020-0124418 | A | 11/2020 |
| KR | 10-2021-0081121 | A1 | 7/2021 |
| KR | 10-2021-0131532 | A1 | 11/2021 |
| WO | 2010/109606 | A1 | 9/2010 |

OTHER PUBLICATIONS

Office Action in Russian Application No. 2022127565 dated May 30, 2023 and English translation thereof.
Extended European Search Report in European Application No. 22203834.1 dated Jul. 21, 2023.

* cited by examiner

AUTOMATED TELLER MACHINE AND METHOD OF CONTROLLING THE SAME

TECHNICAL FIELD

The present disclosure relates to an automated teller machine and a method of controlling the same.

BACKGROUND

An automated teller machine (ATM) is a device that is installed in a place other than a window in a financial institution such as a bank so that customers can conveniently use various financial services without restriction of time and place. The automated teller machine can provide various financial services such as cash deposit/withdrawal, account transfer, balance inquiry, and passbook printing.

Such an automated teller machine may include therein a medium storage box that may store mediums such as cash or checks, and a proper amount of mediums may be stored in the medium storage box. A medium stored in the medium storage box may be taken out of the medium storage box by a customer's request for withdrawal, and a new medium may be carried into the medium storage box by a customer's request for deposit. As such, a proper amount of the mediums stored in the medium storage box need to be maintained in preparation for the customer's request for deposit or withdrawal, and it is necessary to manage and monitor whether a proper amount of mediums is stored in the medium storage box in real time.

However, when a management company for replenishing the automated teller machine with mediums is far away from the automated teller machine, it is not easy for the management company to manage the amount of mediums in the automated teller machine in real time.

For example, in the case that the mediums in the automated teller machine are insufficient, the automated teller machine may be replenished with mediums through a customer's deposit while a person of the management company goes to replenish the automated teller machine with new mediums. Further, in the case that the mediums in the automated teller machine are sufficient, the mediums in the automated teller machine may be depleted through a customer's withdrawal. Further, in the automated teller machine, it may be difficult to selectively replenish the medium storage box of the automated teller machine with only normal banknotes among replenishment banknotes in a transit cassette. In addition, it may be difficult to transfer rejection banknotes included in the replenishment banknotes back to the transit cassette.

SUMMARY

In view of the above, the present disclosure provides an automated teller machine and a method of controlling the same, which are capable of recovering a medium stored in a transit cassette or a deposit cassette through a recovery transit cassette connected to a front side of a main body of the automated teller machine, and replenishing a recycle cassette with replenishment banknotes in a replenishment transit cassette connected to the front side of the main body.

In accordance with a first aspect of the present disclosure, there is provided an automated teller machine including: a main body having an entrance for replenishment and recovery to which a recovery transit cassette or a replenishment transit cassette is connected; a reception unit through which deposit or withdrawal of a medium is made; an identification unit serving to identify whether a medium is a normal banknote or a rejection banknote; a recycle cassette configured to store the medium recognized as the normal banknote; a reject cassette configured to store the medium recognized as the rejection banknote; a deposit cassette configured to store the medium deposited through the reception unit; a utility cassette disposed in a lower portion of the main body, the utility cassette serving to store various types of mediums for universal purpose; a conveyance path through which the medium is conveyed between the entrance for replenishment and recovery, the reception unit, the identification unit, the deposit cassette, the recycle cassette, the reject cassette and the utility cassette; and a control unit configured to control the conveyance path such that when the medium is recovered through the recovery transit cassette, the medium recognized as the normal banknote by the identification unit, among the mediums stored in the deposit cassette and the recycle cassette, is recovered to the recovery transit cassette, and when the medium is replenished through the replenishment transit cassette, the medium recognized as the rejection banknote by the identification unit, among replenishment mediums stored in the replenishment transit cassette, is replenished to the utility cassette.

The main body may include: an upper body in which the reception unit and the identification unit are provided, the entrance for replenishment and recovery being provided in a front portion of the upper body; and a lower body in which the deposit cassette, the recycle cassette, the reject cassette, and the utility cassette are provided.

The control unit may be configured to control the conveyance path such that when the medium is recovered through the recovery transit cassette, the medium recognized as the rejection banknote by the identification unit, among the mediums stored in the deposit cassette and the recycle cassette, is accommodated in the reject cassette.

The control unit may be configured to control the conveyance path such that when the medium is replenished through the replenishment transit cassette, the medium recognized as the normal banknote by the identification unit, among the replenishment mediums stored in the replenishment transit cassette, is replenished to the recycle cassette.

The identification unit may further identify whether the medium is a non-replenishment banknote that is not needed to be replenished in the automated teller machine, and the control unit may be configured to control the conveyance path such that when the medium is replenished through the replenishment transit cassette, the medium recognized as the non-replenishment banknote by the identification unit is accommodated in the deposit cassette.

The control unit may be configured to control the conveyance path such that when the non-replenishment banknote accommodated in the deposit cassette is re-recognized as the normal banknote by the identification unit, the non-replenishment banknote re-recognized as the normal banknote is accommodated in the replenishment transit cassette, and when the non-replenishment banknote accommodated in the deposit cassette is re-recognized as the rejection banknote by the identification unit, the non-replenishment banknote re-recognized as the rejection banknote is accommodated in the utility cassette.

The utility cassette may be disposed adjacent to the recovery transit cassette or the replenishment transit cassette and positioned above the reject cassette.

In accordance with a second aspect of the present disclosure, there is provided a method of controlling an automated teller machine, including: a recovery transfer step of transferring a medium stored in a deposit cassette or a recycle cassette in a main body to an identification unit; a recovery identification step of identifying and recognizing the medium transferred to the identification unit as a normal banknote or a rejection banknote; a recovery storage step of recovering the medium recognized as the normal banknote by the identification unit through a recovery transit cassette connected to the main body, and transferring the medium recognized as the rejection banknote by the identification unit to the reject cassette to be accommodated therein; a replenishment introduction step of receiving a replenishment banknote from a replenishment transit cassette connected to the main body and transferring the received replenishment banknote to the identification unit; a replenishment identification step of identifying and recognizing the replenishment banknote transferred to the identification unit as a normal banknote or a rejection banknote; and a replenishment storage step of transferring the medium recognized as the normal banknote by the identification unit to the recycle cassette to be accommodated therein, and transferring the medium recognized as the rejection banknote by the identification unit to a utility cassette installed in a lower portion of the main body.

In the replenishment identification step, among the replenishment banknotes transferred to the identification unit, a non-replenishment banknote that is not needed to be replenished may be recognized by the identification unit.

The method may further include: a replenishment deposit step of transferring the medium recognized as the non-replenishment banknote by the identification unit to the deposit cassette to be accommodated therein; replenishment re-transfer step of transferring the non-replenishment banknote accommodated in the deposit cassette to the identification unit; a replenishment re-identification step of re-identifying and recognizing the non-replenishment banknote transferred to the identification unit as a normal banknote or a rejection banknote; and a replenishment re-storage step of transferring the non-replenishment banknote recognized as the normal banknote by the identification unit to the replenishment transit cassette to be recovered, and transferring the non-replenishment banknote recognized as the rejection banknote by the identification unit to the utility cassette to be accommodated therein.

According to embodiments of the present disclosure, it is possible to increase the degree of reflux of mediums by using the recovery transit cassette in which no medium is stored through the recovery of the mediums in the deposit cassette used exclusively for deposit, which reduces the costs.

In addition, according to embodiments of the present disclosure, a normal banknote, among the mediums stored in the recycle cassette and the deposit cassette, can be recovered to the recovery transit cassette, and a non-replenishment banknote, among the mediums transferred from the replenishment transit cassette can be temporarily stored in the deposit cassette and delivered to the replenishment transit cassette.

Further, according to embodiments of the present disclosure, the replenishment transit cassette in which no rejection banknote is included can be used again for replenishment transactions without separate settlement, which reduces the costs.

Furthermore, according to embodiments of the present disclosure, replenishment and recovery of mediums can be performed simply and quickly by using the replenishment transit cassette for replenishment of mediums and the recovery transit cassette for recovery of mediums, respectively.

DETAILED DESCRIPTION

Figure 1:
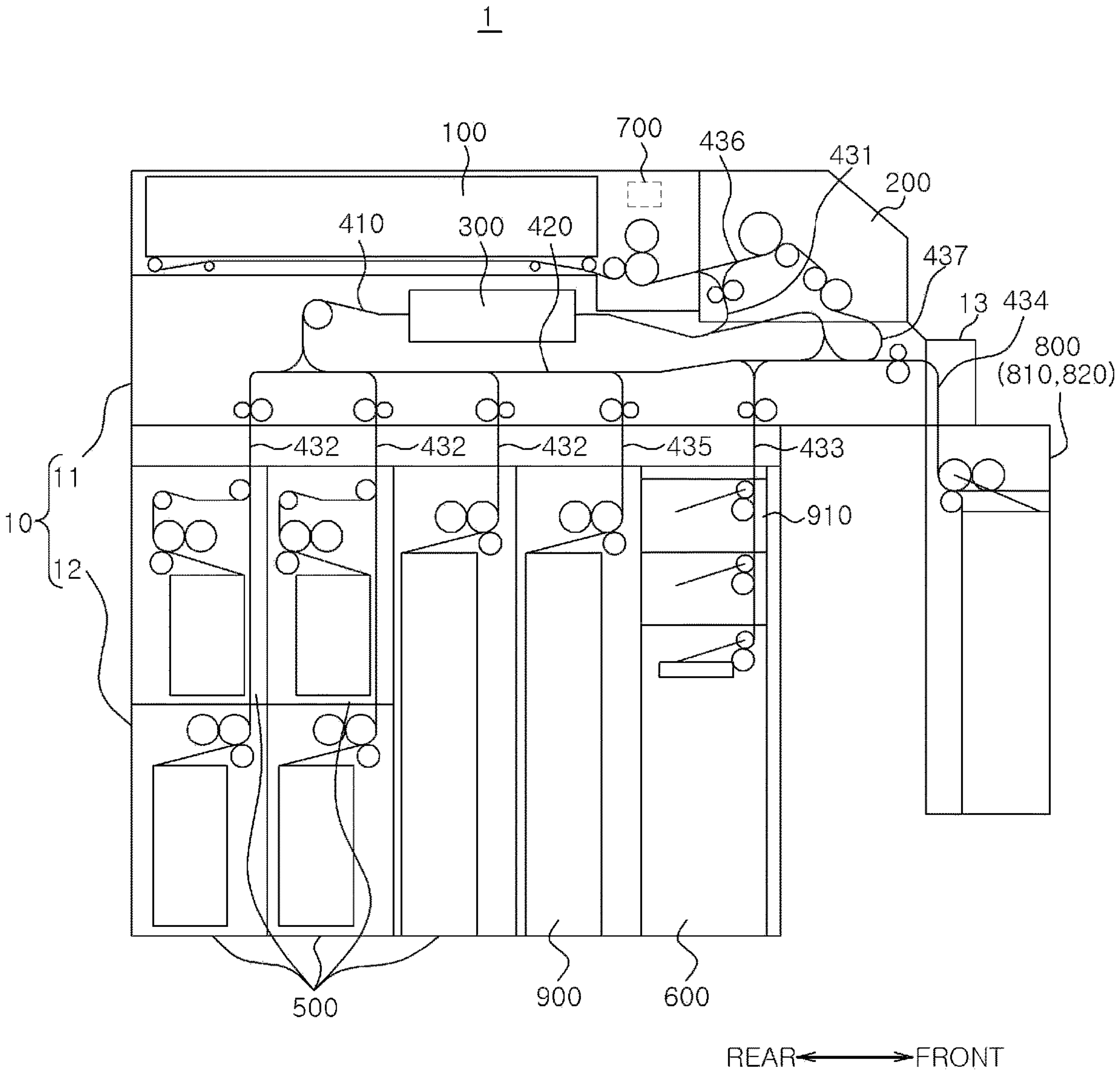
FIG. 1 is a diagram schematically illustrating a configuration of an automated teller machine according to one embodiment of the present disclosure.
Figure 2:
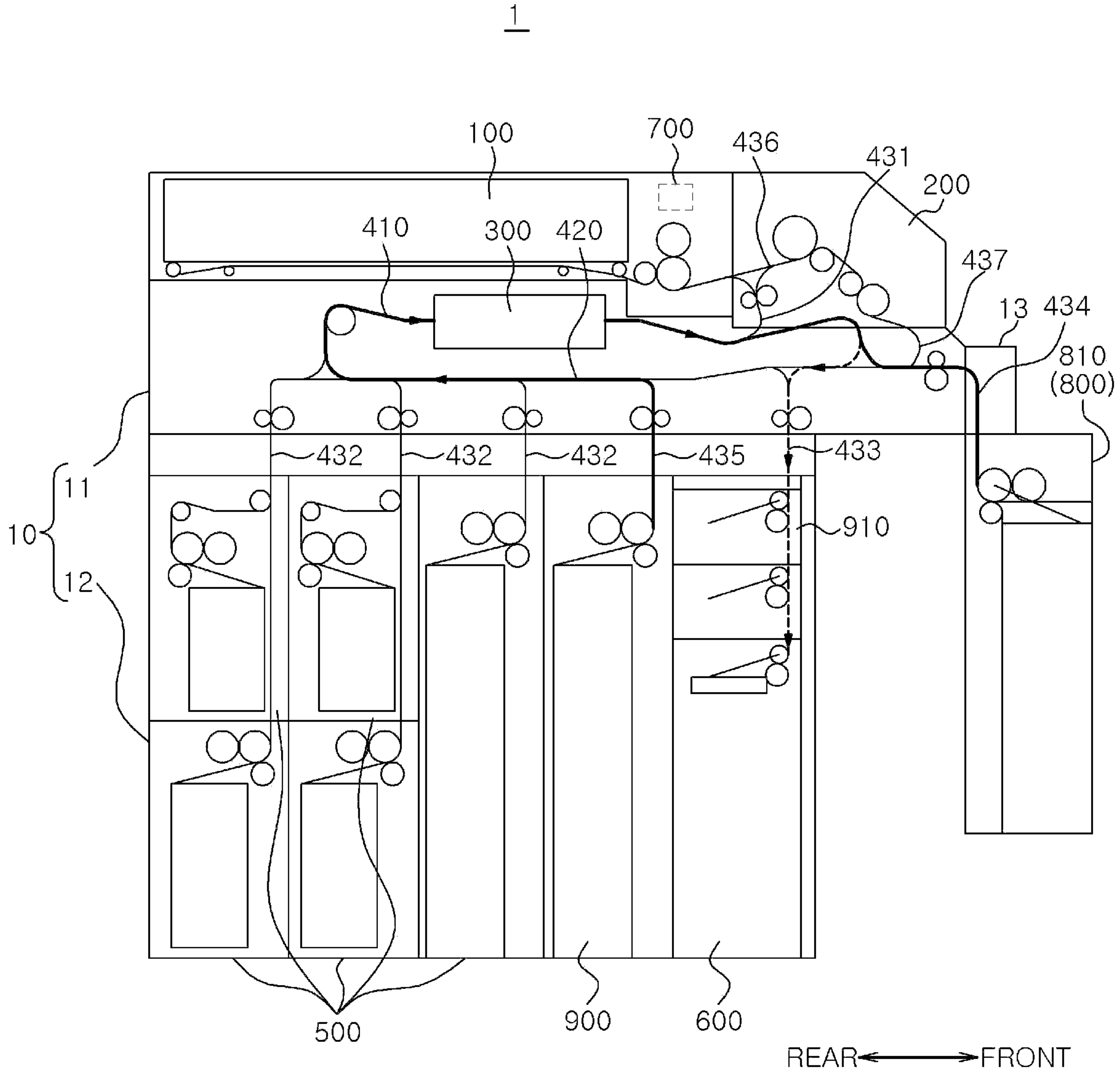
FIG. 2 is a state diagram illustrating a flow of a medium in a deposit cassette when the medium is recovered through a recovery transit cassette in the automated teller machine according to one embodiment of the present disclosure.
Figure 3:
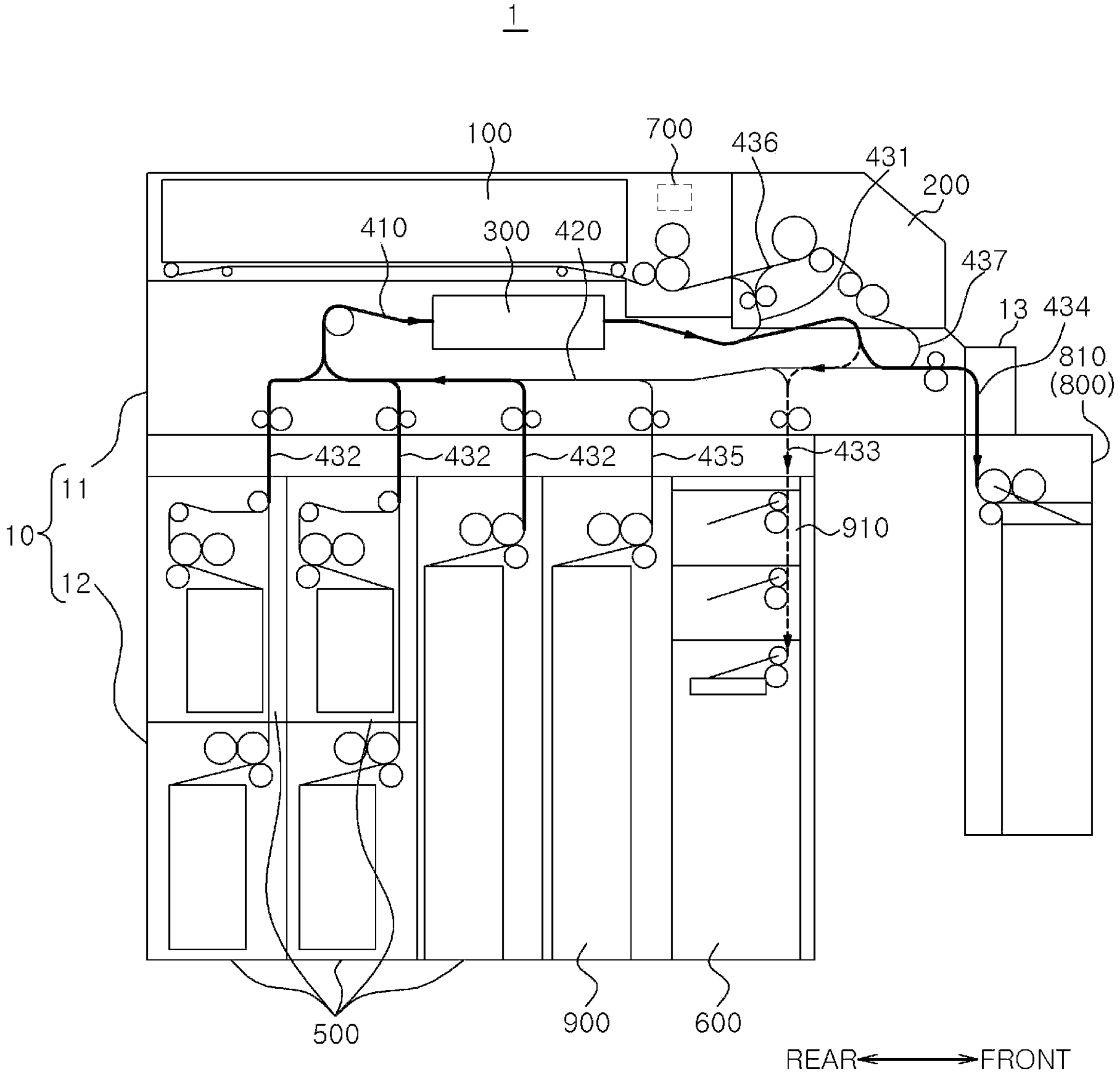
FIG. 3 is a state diagram illustrating a flow of a medium in a recycle cassette when the medium is recovered through a recovery transit cassette in the automated teller machine according to one embodiment of the present disclosure.
Figure 4:
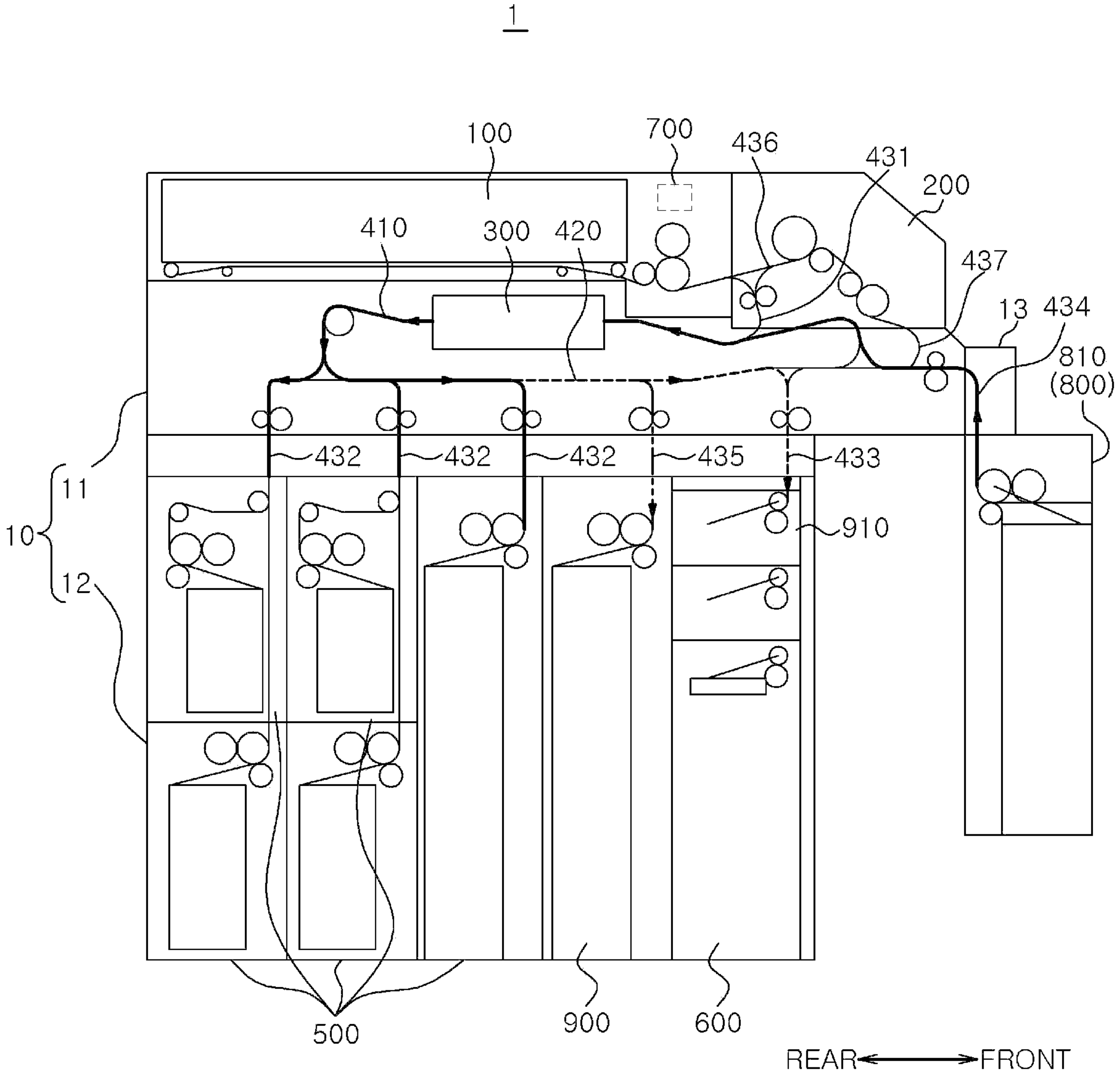
FIG. 4 is a state diagram illustrating a flow of a medium in a replenishment transit cassette when the medium is replenished through the replenishment transit cassette in the automated teller machine according to one embodiment of the present disclosure.

Hereinafter, a configuration and operation according to an embodiment of the present disclosure will be described in detail with reference to the accompanying drawings.

Further, in describing the present disclosure, detailed descriptions of known configurations or functions may be omitted to clarify the present disclosure.

When an element is referred to as being 'connected' to or 'transferred' to another element, it should be understood that the element may be directly connected to or transferred to the other element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Hereinafter, a configuration of an automated teller machine 1 according to one embodiment of the present disclosure will be described in detail with reference to the accompanying drawings.

As shown in FIGS. 1 to 6, when a medium is recovered, the automated teller machine 1 according to one embodiment of the present disclosure may recover the medium stored in a recycle cassette 500 and a deposit cassette 900 through a transit cassette 800. In addition, when a medium is replenished, the automated teller machine 1 may temporarily store a non-replenishment banknote from the transit cassette 800 in the deposit cassette 900 that is empty and then recover the non-replenishment banknote temporarily stored in the deposit cassette 900 to the transit cassette 800. Here, the transit cassette 800 may be divided into a recovery transit cassette 810 used for recovery of a medium and a replenishment transit cassette 820 used for replenishment of a medium.

The automated teller machine 1 may include a main body 10, a reception unit 200, an identification unit 300, a conveyance path, a recycle cassette 500, a reject cassette 600, a control unit 700, a deposit cassette 900, and a utility cassette 910.

The main body 10 may include a frame/housing that provides an overall appearance of the automated teller machine 1. The main body 10 may include an upper body 11 in which the reception unit 200 and the identification unit 300 are provided, and a lower body 12 in which the recycle cassette 500, the reject cassette 600, the deposit cassette 900, and the utility cassette 910 are provided. The lower body 12 may be a safe that provides a storage space for mediums.

The reception unit 200 may be provided in an upper front portion of the main body 10. Here, the front portion of the main body 10 may be understood as the side (right side of the drawing) where the reception unit 200 through which the deposit or withdrawal of mediums are made by a customer is located. An entrance 13 for replenishment and recovery to which the transit cassette 800 can be connected may be provided at a lower side of the front portion of the main body 10. Further, a temporary holding unit 100 may be provided in an upper rear portion of the main body 10. The temporary holding unit 100 may be used for temporarily accommodating mediums. The temporary holding unit 100 may be connected to an upper conveyance path 410 through a first branch conveyance path 431, which will be described later.

The reception unit 200 may provide a space in which a medium deposited by a customer is carried, and may provide a space from which a medium that needs to be withdrawn by a customer is taken out. The reception unit 200 may be connected to the first branch conveyance path 431 through a sixth branch conveyance path 436 which will be described later. When a customer deposits a medium, the reception unit 200 may transfer the deposited medium, through the sixth branch conveyance path 436, the first branch conveyance path 431 and the upper conveyance path 410, to the identification unit 300. In addition, the reception unit 200 may be connected through a seventh branch conveyance path 437 to a front-side connection point at which the upper conveyance path 410 and a lower conveyance path 420 are connected.

The identification unit 300 may recognize the medium as any one of a normal banknote, a reject banknote, and a non-replenishment banknote, by identifying whether the medium moving along the conveyance path has an abnormality. In this specification, mediums may be divided into normal banknotes, rejection banknotes, or non-replenishment banknotes. The normal banknote is a replenishment banknote that needs to be replenished in the automated teller machine 1 or a recovery banknote that needs to be recovered from the automated teller machine 1 to the transit cassette 800.

In addition, the rejection banknote is an abnormal banknote, and may be a damaged or forged banknote or paper other than a banknote. For example, the reject banknote may be a torn banknote, a forged banknote, or a receipt. Further, the rejection banknote may include a normal banknote that was not damaged in the recycle cassette 500, the deposit cassette 900 and the transit cassette 800 but is damaged while moving along the conveyance path, and a normal banknote that was not damaged when conveyed in the temporary holding unit 100 but is damaged while moving along the conveyance path after taken out from the temporary holding unit 100.

Furthermore, the non-replenishment banknote is a normal banknote that is not needed to be replenished since a sufficient amount of medium, which satisfies a preset quantity, is stored in the automated teller machine 1. For example, the non-replenishment banknote may be a banknote, among the replenishment banknotes in the transit cassette 800, that is left without being replenished since the number of the mediums stored in the automated teller machine 1 comes to satisfy the preset quantity due to a customer's deposit while a person of a management company goes to replenish mediums.

The conveyance path may convey mediums between the temporary holding unit 100, the identification unit 300, the reception unit 200, the recycle cassette 500, the reject cassette 600, the transit cassette 800, the deposit cassette 900, and the utility cassette 910. The conveyance path may include a driving roller, a driven roller, a switch gate and the like to transfer the mediums. Further, the conveyance path may be driven by a motor (not shown), and may be controlled by the control unit 700. The conveyance path may include an upper conveyance path 410, a lower conveyance path 420, a first branch conveyance path 431, a second branch conveyance path 432, a third branch conveyance path 433, a fourth branch conveyance path 434, a fifth branch conveyance path 435, a sixth branch conveyance path 436 and a seventh branch conveyance path 437.

The upper conveyance path 410 may provide a moving path of mediums that are input/output to/from the identification unit 300. The upper conveyance path 410 may be connected to the lower conveyance path 420 to form a closed loop. The upper conveyance path 410 may be provided above the lower conveyance path 420. The first branch conveyance path 431 may branch from the upper conveyance path 410. The upper conveyance path 410 may transfer mediums, conveyed from the temporary holding unit 100 or the reception unit 200, through the identification unit 300 to the lower conveyance path 420, or may transfer mediums output from the identification unit 300 to the temporary holding unit 100, the reception unit 200 or the lower conveyance path 420.

The lower conveyance path 420 may be connected to the upper conveyance path 410 to form a closed loop. A plurality of second branch conveyance paths 432 may branch from the lower conveyance path 420. In the lower conveyance path 420, a branch point to the reject cassette 600 and a branch point to the recycle cassette 500 may be sequentially placed in the direction toward the front portion (where the reception unit 200 is located) of the main body 10. The switch gate may be provided at each branch point of the lower conveyance path 420 to be operated under the control of the control unit 700. Through the adjustment of the switch gates under the control of the control unit 700, the lower conveyance path 420 may convey mediums, conveyed from the upper conveyance path 410, to the recycle cassette 500, or may convey mediums, conveyed from the recycle cassette 500, to the upper conveyance path 410.

The first branch conveyance path 431 may branch from the upper conveyance path 410 to provide a medium moving path between the upper conveyance path 410 and the temporary holding unit 100. The first branch conveyance path 431 may branch upwardly from the upper conveyance path 410. The sixth branch conveyance path 436 may branch from the first branch conveyance path 431. The switch gate operated under the control of the control unit 700 may be provided at a branch point of the first branch conveyance path 431 from which the sixth branch conveyance path 436 branches.

The second branch conveyance paths 432 may branch from the lower conveyance path 420 to provide medium moving paths between the lower conveyance path 420 and the recycle cassettes 500. The second branch conveyance paths 432 may branch forward and downward from the lower conveyance path 420 with reference to the direction toward the front portion of the main body 10.

Through the adjustment of the switch gates under the control of the control unit 700, the third branch conveyance path 433 may provide a moving path of the medium between the lower conveyance path 420 and the reject cassette 600. The third branch conveyance path 433 may branch rearward and downward from the lower conveyance path 420 with reference to the direction toward the front portion of the main body 10.

The fourth branch conveyance path 434 may provide a medium moving path between the front-side connection point of the upper conveyance path 410 and the lower conveyance path 420, and the entrance 13 for replenishment and recovery. For example, the fourth branch conveyance path 434 may transfer the medium received from the transit cassette 800 to the upper conveyance path 410, or transfer the medium received from the upper conveyance path 410 to the transit cassette 800.

The fifth branch conveyance path 435 may provide a medium moving path between the lower conveyance path 420 and the deposit cassette 900. Accordingly, the fifth branch conveyance path 435 may transfer the medium received from the deposit cassette 900 to the lower conveyance path 420, or may transfer the medium received from the lower conveyance path 420 to the deposit cassette 900.

The sixth branch conveyance path 436 may branch from the first branch conveyance path 431 to be connected to the reception unit 200. Through the adjustment of the switch gates under the control of the control unit 700, the sixth branch conveyance path 436 may provide a medium moving path between the reception unit 200 and the temporary holding unit 100, or provide a medium moving path between the reception unit 200 and the upper conveyance path 410.

The seventh branch conveyance path 437 may branch at a connection point between the upper conveyance path 410 and the lower conveyance path 420 to be connected to the reception unit 200. Through the adjustment of the switch gates under the control of the control unit 700, the seventh branch conveyance path 437 may transfer the medium conveyed from the reception unit 200 to the lower conveyance path 420.

At the branch point of the upper conveyance path 410 and the lower conveyance path 420, a switch gate for changing the medium moving path of the may be provided. In addition, at the branch point of the lower conveyance path 420 and the third branch conveyance path 433, a switch gate for changing the medium moving path may be provided. In addition, at the branch point of the first branch conveyance path 431 and the sixth branch conveyance path 436, a switch gate for changing the medium moving path may be provided. The switch gate may change its posture through rotation to selectively determine the medium moving path under the control of the control unit 700

The recycle cassette 500 may store the medium recognized as a normal banknote by the identification unit 300. The medium stored in the recycle cassette 500 may be taken out through the transit cassette 800 when recovery is required, and may be taken out through the reception unit 200 when a customer requests withdrawal. A plurality of the recycle cassettes 500 may be provided. The mediums may be separated and stored in the plurality of recycle cassettes 500 for each type of banknote.

A sensor (not shown) may be provided in the recycle cassette 500 to maintain an appropriate amount of mediums for each type of banknote in preparation for a customer's request for withdrawal. The sensor may detect in real time whether an appropriate amount of mediums is stored in the recycle cassette 500, and notify a management company for the automated teller machine 1 whether it is necessary to replenish or recover the mediums in the recycle cassette 500.

The reject cassette 600 may store a damaged medium (e.g., a rejection banknote). The reject cassette 600 may be positioned in the lower front portion of the main body 10 to be positioned close to the transit cassette 800. Since the reject cassette 600 is positioned adjacent to the transit cassette 800, mediums can be quickly moved between the reject cassette 600 and the transit cassette 800.

The control unit 700 may be implemented by a calculation device including a microprocessor, a measuring device such as a sensor, and a memory. Since the implementation method is obvious to those skilled in the art, a detailed description thereof will be omitted. Hereinafter, the control method of the control unit 700 will be described in detail.

When the medium stored in the deposit cassette 900 is recovered through the recovery transit cassette 810, the control unit 700 may control the conveyance path such that the medium stored in the deposit cassette 900 is recovered to the recovery transit cassette 810. For example, referring to FIG. 2, the control unit 700 may control the fifth branch conveyance path 435, the lower conveyance path 420, and the upper conveyance path. 410 such that the medium stored in the deposit cassette 900 is transferred to the identification unit 300.

Then, the control unit 700 may control the conveyance path such that the medium recognized in the identification unit 300 is transferred to different places depending on the state of the medium recognized by the identification unit 300. For example, when the medium is recognized as a normal banknote by the identification unit 300, the control unit 700 may control the upper conveyance path 410 and the fourth branch conveyance path 434 such that the medium recognized in the identification unit 300 as a normal banknote is transferred to the recovery transit cassette 810 (indicated by a thick line in FIG. 2). In addition, when the medium is recognized as a rejection banknote by the identification unit 300, the control unit 700 may control the upper conveyance path 410 and the third branch conveyance path 433 such that the medium recognized in the identification unit 300 as a rejection banknote is transferred to the reject cassette 600 (indicated by a dotted line in FIG. 2).

Further, when the medium stored in the recycling cassette 500 is recovered through the recovery transit cassette 810, the control unit 700 may control the conveyance path such that the medium stored in the recycle cassette 500 is recovered to the recovery transit cassette 810. For example, referring to FIG. 3, the control unit 700 may control the second branch conveyance path 432, the lower conveyance path 420, and the upper conveyance path 410 such that the medium stored in the recycle cassette 500 is transferred to the identification unit 300.

Then, the control unit 700 may control the conveyance path such that the medium recognized in the identification unit 300 is transferred to different places depending on the state of the medium recognized by the identification unit 300. For example, when the medium is recognized as a normal banknote by the identification unit 300, the control unit 700 may control the upper conveyance path 410 and the fourth branch conveyance path 434 such that the medium recognized in the identification unit 300 as a normal banknote is transferred to the recovery transit cassette 810 (indicated by a thick line in FIG. 3). In addition, when the medium is recognized as a rejection banknote by the identification unit 300, the control unit 700 may control the upper conveyance path 410 and the third branch conveyance path 433 such that the medium recognized in the identification unit 300 as a rejection banknote is transferred to the reject cassette 600 (indicated by a dotted line in FIG. 3).

Meanwhile, in order to replenish the recycle cassette 500 with the medium stored in the replenishment transit cassette 820, the control unit 700 may control the conveyance path such that the medium stored in the replenishment transit cassette 820 is replenished to the recycle cassette 500. For example, referring to FIG. 4, the control unit 700 may control the fourth branch conveyance path 434 and the upper conveyance path 410 such that the medium stored in the replenishment transit cassette 820 is transferred to the identification unit 300.

Then, the control unit 700 may control the conveyance path such that the medium recognized in the identification unit 300 is transferred to different places depending on the state of the medium recognized by the identification unit 300. For example, when the medium is recognized as a normal banknote by the identification unit 300, the control unit 700 may control the upper conveyance path 410 and the second branch conveyance path 432 such that the medium recognized in the identification unit 300 as a normal banknote is transferred to the recycle cassette 500 (indicated by a thick line in FIG. 4). Further, when the medium is recognized as a rejection banknote by the identification unit 300, the control unit 700 may control the upper conveyance path 410, the lower conveyance path 420 and the third branch conveyance path 433 such that the medium recognized in the identification unit 300 as a rejection banknote is transferred to the utility cassette 910 (indicated by a dotted line in FIG. 4). In addition, when the medium is recognized as a non-replenishment banknote by the identification unit 300, the control unit 700 may control the upper conveyance path 410, the lower conveyance path 420 and the fifth branch conveyance path 435 such that the medium recognized as a non-replenishment banknote by the identification unit 300 is temporarily stored in the deposit cassette 900 (indicated by a dashed-dotted line in FIG. 4).

When the medium is temporarily stored in the deposit cassette 900, the control unit 700 may control the conveyance path such that the medium temporarily stored in the deposit cassette 900 is transferred to the replenishment transit cassette 820 or the utility cassette 910 through the identification unit 300.

Figure 5:
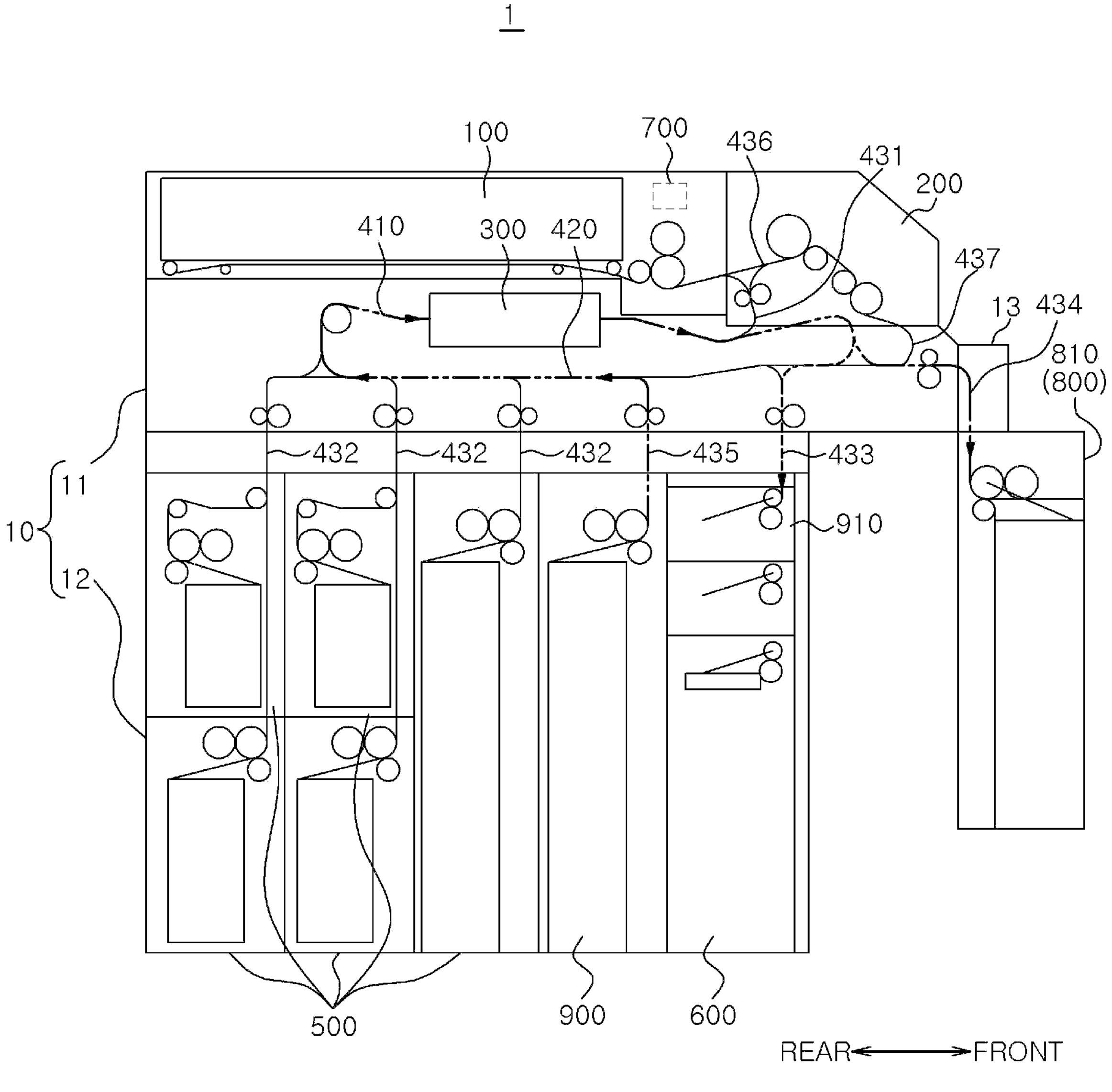
FIG. 5 is a state diagram illustrating a flow of a medium in the deposit cassette when the medium is replenished through the replenishment transit cassette in the automated teller machine according to one embodiment of the present disclosure.

For example, when the medium is recognized as a normal non-replenishment banknote by the identification unit 300, the control unit 700 may control the upper conveyance path 410 and the fourth branch conveyance path 434 such that the medium recognized as a normal non-replenishment banknote by the identification unit 300 is recovered to the replenishment transit cassette 820 (indicated by a dashed-dotted line in FIG. 5). Further, when the medium is recognized as a rejection non-replenishment banknote by the identification unit 300, the control unit 700 may control the upper conveyance path 410 and the third branch conveyance path 433 such that the medium recognized as a rejection non-replenishment banknote by the identification unit 300 is transferred to the utility cassette 910 (indicated by a dotted line in FIG. 5).

The deposit cassette 900 may store a medium deposited through the reception unit 200. For example, the medium deposited in the reception unit 200 by a customer's deposit request may be transferred into the deposit cassette 900 through the identification unit 300. The deposit cassette 900 may be provided with a sensor (not shown) for sensing an appropriate amount of mediums deposited by customers. The sensor may sense in real time whether an appropriate amount of mediums are stored in the deposit cassette 900, and may inform a management company for the automated teller machine 1 whether the mediums in the deposit cassette 900 need to be replenished or recovered.

The utility cassette 910 may be understood as a cassette in which various types of mediums can be stored for a general purpose. The utility cassette 910 may be positioned in the lower front portion of the main body 10 close to the transit cassette 800 to face it. More specifically, the utility cassette 910 may be positioned at an upper side of the reject cassette 600. The utility cassette 910 may receive a medium through a conveyance path branching from the third branch conveyance path 433.

Hereinafter, a method of controlling the automated teller machine according to the embodiment of the present disclosure will be described.

Referring to FIGS. 2 to 5, a control method for the automated teller machine may control the automated teller machine so that the mediums accommodated in the recycle cassette 500 and the deposit cassette 900 are recovered through the recovery transit cassette 810, the medium conveyed through the replenishment transit cassette 820 is replenished to the recycle cassette 500, and the rejection banknote occurred during the replenishment is transferred to the utility cassette 910.

Figure 6:
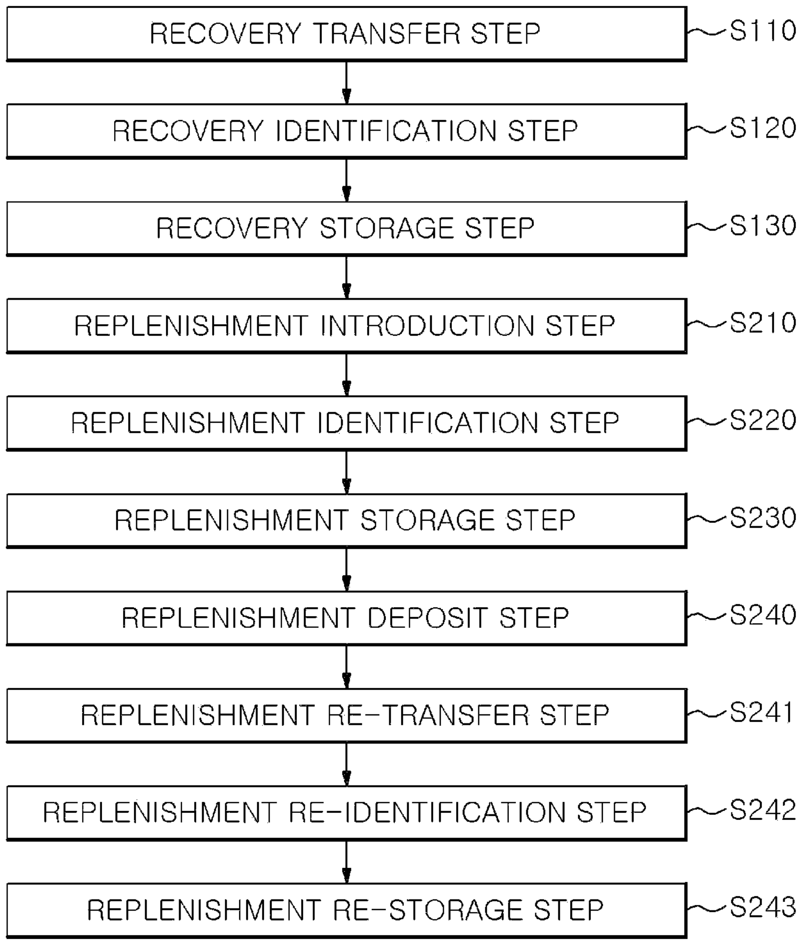
FIG. 6 is a flowchart schematically illustrating a method of controlling the automated teller machine according to one embodiment of the present disclosure.

As shown in FIG. 6, the control method for automated teller machine may include a recovery transfer step S110, a recovery identification step S120, a recovery storage step S130, a replenishment introduction step S210, and a replenishment identification step S220, a replenishment storage step S230, a replenishment deposit step S240, a replenishment re-transfer step S241, a replenishment re-identification step S242 and a replenishment re-storage step S243.

In the recovery transfer step S110, in order to recover the mediums in the recycle cassette 500 and the deposit cassette 900 to the recovery transit cassette 810, the mediums stored in the recycle cassette 500 and the deposit cassette 900 in the lower body 12 may be transferred to the identification unit 300. In order to transfer the mediums stored in the recycle cassette 500 and the deposit cassette 900 to the identification unit 300, the second branch conveyance path 432, the third branch conveyance path 433, the lower conveyance path 420, and the upper conveyance path 410 may be used. In this case, a state in which the empty recovery transit cassette 810 in which no medium is accommodated is connected to the replenishment/recovery entrance 13 of the lower body 12 is maintained.

In the recovery identification step S120, the medium transferred to the identification unit 300 may be identified and recognized as a normal banknote or a rejection banknote. In the recovery identification step S120, the medium recognized as the normal banknote may be transferred to the recovery transit cassette 810 for recovery. In order to transfer the medium recognized as the normal banknote to the recovery transit cassette 810, the upper conveyance path 410 and the fourth branch conveyance path 432 may be used.

Then, the medium recognized as the rejection banknote in the recovery identification step S120 may be transferred to the reject cassette 600. In order to transfer the medium recognized as the rejection banknote to the reject cassette 600, the upper conveyance path 410 and the third branch conveyance path 433 may be used.

In the recovery storage step S130, the medium recognized as the normal banknote by the identification unit 300 is recovered and stored through the recovery transit cassette 810 connected to the main body 10, and the medium recognized as the rejection banknote by the identification unit 300 is transferred to the reject cassette 600 to be accommodated therein.

Meanwhile, in the replenishment introduction step S210, in order to replenish the recycle cassette 500 with the replenishment banknote in the replenishment transit cassette 820, the replenishment banknote received from the replenishment transit cassette 820 may be transferred to the identification unit 300. In order to receive the replenishment banknote from the replenishment transit cassette 820 and transfer it to the identification unit 300, the fourth branch conveyance path 434 and the upper conveyance path 410 may be used. In this case, a state that the replenishment transit cassette 820 in which the replenishment banknote is accommodated is connected to the replenishment/recovery entrance 13 of the lower body 12 is maintained.

In the replenishment identification step S220, the replenishment banknote transferred to the identification unit 300 may be identified and recognized as a normal banknote or a rejection banknote. In addition, in the replenishment identification step S220, among the replenishment banknotes transferred to the identification unit 300, a non-replenishment banknote that is left without being replenished since the number of the mediums stored in the automated teller machine 1 comes to satisfy the preset quantity due to a customer's deposit while a person of the management company goes to replenish mediums may be recognized.

In the replenishment storage step S230, the medium recognized by the identification unit 300 as the normal banknote may be transferred to the recycle cassette 500 to be accommodated therein. In order to transfer the medium recognized as the normal banknote to the recycle cassette 500, the upper conveyance path 410, the lower conveyance path 420, and the second branch conveyance path 432 may be used.

In the replenishment storage step S230, the medium recognized by the identification unit 300 as the rejection banknote may be transferred to the utility cassette 910 to be accommodated therein. In order to transfer the medium recognized as the rejection banknote to the utility cassette 910, the upper conveyance path 410, the lower conveyance path 420, and the third branch conveyance path 433 may be used.

In the replenishment deposit step S240, the medium recognized as the non-replenishment banknote by the identification unit 300 may be transferred to the deposit cassette 900. In order to transfer the medium recognized as the non-replenishment banknote to the deposit cassette 900, the upper conveyance path 410, the lower conveyance path 420, and the fifth branch conveyance path 435 may be used.

In the replenishment re-transfer step S241, the medium accommodated in the deposit cassette 900 may be transferred to the identification unit 300. In order to transfer the medium in the deposit cassette 900 to the identification unit 300, the fifth branch conveyance path 435, the lower conveyance path 420, and the upper conveyance path 410 may be used.

In the replenishment re-identification step S242, the medium transferred to the identification unit 300 may be re-identified and recognized as a normal non-replenishment banknote or a rejection non-replenishment banknote.

In the replenishment re-storage step S243, the medium recognized by the identification unit 300 as the normal non-replenishment banknote may be transferred to the replenishment transit cassette 820 to be recovered. In order to transfer the medium recognized as the normal non-replenishment banknote to the replenishment transit cassette 820, the upper conveyance path 410 and the fourth branch conveyance path 434 may be used.

Further, in the replenishment re-storage step S243, the non-replenishment banknote recognized as the rejection banknote by the identification unit 300 may be transferred to the utility cassette 910 to be accommodated therein. In order to transfer the non-replenishment banknote recognized as the rejection banknote to the utility cassette 910, the upper conveyance path 410 and the third branch conveyance path 433 may be used.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. An automated teller machine comprising:

a main body having an entrance for replenishment and recovery to which a recovery transit cassette or a replenishment transit cassette is connected;

a reception unit through which deposit or withdrawal of a medium is made;

an identification unit serving to identify whether a medium is a normal banknote or a rejection banknote;

a recycle cassette configured to store the medium recognized as the normal banknote;

a reject cassette configured to store the medium recognized as the rejection banknote;

a deposit cassette configured to store the medium deposited through the reception unit;

a utility cassette disposed in a lower portion of the main body, the utility cassette serving to store various types of mediums for universal purpose;

a conveyance path through which the medium is conveyed between the entrance for replenishment and recovery, the reception unit, the identification unit, the deposit cassette, the recycle cassette, the reject cassette and the utility cassette; and a control unit configured to control the conveyance path such that when the medium is recovered through the recovery transit cassette, the medium recognized as the normal banknote by the identification unit, among the mediums stored in the deposit cassette and the recycle cassette, is recovered to the recovery transit cassette, and when the medium is replenished through the replenishment transit cassette, the medium recognized as the rejection banknote by the identification unit, among replenishment mediums stored in the replenishment transit cassette, is replenished to the utility cassette, wherein the utility cassette is disposed horizontally adjacent to the deposit cassette and positioned right above the reject cassette.

2. The automated teller machine of claim 1, wherein the main body includes:

an upper body in which the reception unit and the identification unit are provided, the entrance for replenishment and recovery being provided in a front portion of the upper body; and a lower body in which the deposit cassette, the recycle cassette, the reject cassette, and the utility cassette are provided.

3. The automated teller machine of claim 1, wherein the control unit is configured to control the conveyance path such that when the medium is recovered through the recovery transit cassette, the medium recognized as the rejection banknote by the identification unit, among the mediums stored in the deposit cassette and the recycle cassette, is accommodated in the reject cassette.

4. The automated teller machine of claim 1, wherein the control unit is configured to control the conveyance path such that when the medium is replenished through the replenishment transit cassette, the medium recognized as the normal banknote by the identification unit, among the replenishment mediums stored in the replenishment transit cassette, is replenished to the recycle cassette.

5. The automated teller machine of claim 4, wherein the identification unit further identifies whether the medium is a non-replenishment banknote that is not needed to be replenished in the automated teller machine, and the control unit is configured to control the conveyance path such that when the medium is replenished through the replenishment transit cassette, the medium recognized as the non-replenishment banknote by the identification unit is accommodated in the deposit cassette.

6. The automated teller machine of claim 5, wherein the control unit is configured to control the conveyance path such that when the non-replenishment banknote accommodated in the deposit cassette is re-recognized as the normal banknote by the identification unit, the non-replenishment banknote re-recognized as the normal banknote is accommodated in the replenishment transit cassette, and when the non-replenishment banknote accommodated in the deposit cassette is re-recognized as the rejection banknote by the identification unit, the non-replenishment banknote re-recognized as the rejection banknote is accommodated in the utility cassette.

7. The automated teller machine of claim 1, wherein the utility cassette is disposed adjacent to the recovery transit cassette or the replenishment transit cassette.

8. A method of controlling an automated teller machine, comprising:

a recovery transfer step of transferring a medium stored in a deposit cassette or a recycle cassette in a main body to an identification unit;

a recovery identification step of identifying and recognizing the medium transferred to the identification unit as a normal banknote or a rejection banknote;

a recovery storage step of recovering the medium recognized as the normal banknote by the identification unit through a recovery transit cassette connected to the main body, and transferring the medium recognized as the rejection banknote by the identification unit to the reject cassette to be accommodated therein;

a replenishment introduction step of receiving a replenishment banknote from a replenishment transit cassette connected to the main body and transferring the received replenishment banknote to the identification unit;

a replenishment identification step of identifying and recognizing the replenishment banknote transferred to the identification unit as a normal banknote or a rejection banknote; and a replenishment storage step of transferring the medium recognized as the normal banknote by the identification unit to the recycle cassette to be accommodated therein, and transferring the medium recognized as the rejection banknote by the identification unit to a utility cassette installed in a lower portion of the main body, wherein the utility cassette is disposed horizontally adjacent to the deposit cassette and positioned right above the reject cassette.

9. The method of claim 8, wherein in the replenishment identification step, among the replenishment banknotes transferred to the identification unit, a non-replenishment banknote that is not needed to be replenished is recognized by the identification unit.

10. The method of claim 9, further comprising:

a replenishment deposit step of transferring the medium recognized as the non-replenishment banknote by the identification unit to the deposit cassette to be accommodated therein;

replenishment re-transfer step of transferring the non-replenishment banknote accommodated in the deposit cassette to the identification unit;

a replenishment re-identification step of re-identifying and recognizing the non-replenishment banknote transferred to the identification unit as a normal banknote or a rejection banknote; and a replenishment re-storage step of transferring the non-replenishment banknote recognized as the normal banknote by the identification unit to the replenishment transit cassette to be recovered, and transferring the non-replenishment banknote recognized as the rejection banknote by the identification unit to the utility cassette to be accommodated therein.

* * * * *